United States Patent [19]

Ziemek et al.

[11] Patent Number: 5,975,404
[45] Date of Patent: Nov. 2, 1999

[54] APPARATUS FOR MANUFACTURING AN OPTICAL CABLE FROM A METAL TUBE

[75] Inventors: Gerhard Ziemek; Harry Staschewski, both of Langenhagen; Klaus Porcher, Lehrte, all of Germany

[73] Assignee: Alcatel Kabel AG & Co, Germany

[21] Appl. No.: 09/036,452

[22] Filed: Mar. 6, 1998

Related U.S. Application Data

[62] Division of application No. 08/529,489, Sep. 18, 1995, Pat. No. 5,768,762.

[30] Foreign Application Priority Data

Sep. 24, 1994 [DE] Germany ............... 44 34 133

[51] Int. Cl.⁶ .................. B23K 37/047; B23K 101/06
[52] U.S. Cl. .............. 228/17.5; 228/47.1; 228/148; 228/156; 29/781; 156/54; 156/221
[58] Field of Search ................ 228/146–148, 228/155, 156, 17.5, 47.1; 29/430, 781; 156/54, 203, 213, 218, 221, 466

[56] References Cited

U.S. PATENT DOCUMENTS

| | | | |
|---|---|---|---|
| 3,700,158 | 10/1972 | Schatz et al. | 228/17.5 |
| 4,212,097 | 7/1980 | Portinari et al. | |
| 4,759,487 | 7/1988 | Karlinski | 228/17.5 |
| 4,811,888 | 3/1989 | Ziemek et al. | 228/148 |
| 5,072,870 | 12/1991 | Ziemek . | |
| 5,210,391 | 5/1993 | Yoshie et al. | |
| 5,238,172 | 8/1993 | Davay | 228/104 |
| 5,318,215 | 6/1994 | Toya et al. | |
| 5,560,536 | 10/1996 | Moe | 228/102 |
| 5,613,631 | 3/1997 | Ziemek et al. | |
| 5,653,898 | 8/1997 | Yoshie et al. | 219/121.63 |
| 5,868,299 | 2/1999 | Abbey, III | 228/147 |

FOREIGN PATENT DOCUMENTS

| | | |
|---|---|---|
| 0299123 | 1/1989 | European Pat. Off. . |
| 0456836 | 11/1991 | European Pat. Off. . |
| 1164355 | 5/1961 | Germany . |
| 2757786 | 6/1979 | Germany . |
| 3429294 | 12/1984 | Germany . |
| 3910122 | 4/1990 | Germany . |
| 3-267905 | 11/1991 | Japan . |

*Primary Examiner*—Samuel M. Heinrich
*Attorney, Agent, or Firm*—Ware, Fressola, Van der Sluys & Adolphson LLP

[57] ABSTRACT

In a method and apparatus for manufacturing an optical fiber cable, a metal band is gradually shaped into a lengthwise slotted tube, the optical fibers are introduced into the still open slotted tube, the lengthwise slot of the tube is welded and the outside diameter of the welded tube is reduced. The welded tube with the reduced outside diameter is wound at least once around a take-up reel. A force provided on the reduced outside diameter welded tube as it is wound on the take-up reel causes an elastic strain of 0.1 to 0.6% on the tube. The strain is released on the take-up reel to produce an overlength of the optical fibers relative to the reduced outside diameter welded tube.

1 Claim, 1 Drawing Sheet

APPARATUS FOR MANUFACTURING AN OPTICAL CABLE FROM A METAL TUBE

CROSS REFERENCE TO RELATED APPLICATION

This is a divisional application of patent application Ser. No. 08/529,489, filed Sep. 18, 1995, now U.S. Pat. No. 5,768,762. The subject matter of that application is hereby incorporated in full by reference.

BACKGROUND OF THE INVENTION

1. Technical Field

The invention concerns a method for manufacturing an optical cable comprising a metal tube in which at least one optical fiber waveguide is located, wherein a metal band drawn from a supply reel is gradually shaped into a slotted tube, the optical fibers drawn from another supply spool are introduced into the still open slotted tube, the lengthwise slot of the slotted tube is welded, the outside diameter of the welded tube is reduced and the metal band, the optical fibers and the welded tube are transported by a storage reel.

2. Description of the Prior Art

A method for manufacturing such cables is known from EP 0 229 123 B1.

The manufacture of such optical cables involves the significant problem of economically producing an overlength of the optical fibers inside the cable. This overlength is necessary because of the very different thermal expansion coefficients of the metal and glass materials. To prevent mechanical stress of the optical fibers in the event the metal tube exposed to the elevated temperatures, the overlength should not be too small. On the other hand, the overlength should not be too large, since an unacceptable compression of the optical fibers could result when the metal tube is exposed to low temperatures, which leads to an increase in attenuation. The optical fibers must therefore contain an overlength which takes both aspects into consideration, so that unallowable stress conditions cannot occur under any circumstances.

With the method according to EP 0 229 123 B1, the overlength is obtained by introducing the optical fibers with a pushing device into the still open slotted tube at a higher speed than the slotted tube. According to an alternative, the optical fibers are guided by a filler tube to the storage reel area, where they are blown by flowing gas onto the outside surface of the metal tube.

With a method described by EP 0 456 836 A1, the drawn metal band contains a prestress and is thereby elastically strained.

In both methods, an accurate overlength of the optical fibers inside the metal tube is difficult to obtain.

SUMMARY OF THE INVENTION

An object of the present invention is to improve the above mentioned methods so that optical fiber cables of the described kind can be manufactured with the overlength having a high degree of accuracy.

In practicing the method of the invention, the welded tube with the reduced diameter is wound at least once around a take-up reel, and the force with which the take-up reel grips the welded tube causes an elastic strain of 0.1 to 0.6%, and that the elastic strain of the tube is released on the take-up reel.

In a surprisingly simple manner, the invention is able to produce a precisely adjustable overlength of the optical fibers inside the metal tube. The force which produces the elastic strain can be calculated or empirically determined from the properties of the materials and the geometric dimensions of the metal tube.

By winding the metal tube at least once around the take-up reel, a fixed point is created in the optical fibers inside the metal tube. This point lies downstream of the initial contact point of the metal tube on the take-up reel.

The fixed point of the metal tube lies on the take-up reel at the initial contact point where the metal tube meets the take-up reel. The elastic strain is gradually released downstream this point, resulting in the overlength of the optical fibers relative to the metal tube.

It is essential for the invention that a sufficiently large friction force be created between the winding or windings of the metal tube and the surface of the take-up reel. This is achieved in a simple manner in that a tension force downstream of the take-up reel pulls the metal tube to keep the metal tube wound one or more times around the outer surface of the take-up reel. The tension force conferred to the finished cable by a storage reel, which is regulated by a control, is generally sufficient for this purpose.

The reduction of the metal tube diameter is achieved with a functional drawing device. For tubes with the geometric measurements under consideration, this is the best method. In the final analysis, the drawing device determines the outside diameter of the finished cable. The diameter of the welded cable can be selected within certain limitations. This means for example that within a certain range, a metal tube of the same diameter is manufactured for both six as well as even up to twenty optical fibers, which is then reduced to a finished tube with the desired diameter by adjusting the drawing device.

According to a particularly advantageous configuration of the invention, one tube transporting clamping tool each grips the tube before and behind the point at which the tube diameter is reduced. Such a clamping tool is the subject of DBP 1 164 355. Both clamping tools tightly surround the welded metal tube. The result is that the welded tube is elastically strained between the second clamping tool and the take-up reel, as seen in the manufacturing direction.

The magnitude of the elastic strain is controlled in a particularly simple manner by a force which deflects the welded metal tube from the manufacturing direction between the point at which the tube is reduced or the second clamping tool as seen in the manufacturing direction, and the take-up reel. In the simplest configuration, a weight is hung on the tube.

The welded metal tube is wound with at least three windings around the periphery of the take-up reel. This permits the force which grips the tube behind the take-up reel to be reduced to such a degree that no significant elastic strain occurs in the metal tube beyond the take-up reel.

Nearly all soldering or welding methods are suitable for welding the lengthwise seam. However, laser welding proved to be particularly advantageous, since this method is suitable for welding long lengths. Particularly for laser welding, it is indispensable for the welding seam to be aligned as accurately as possible with the laser beam. For this reason, it is advantageous for the tube to be guided by the first clamping tool so that it does not twist under the welding point.

If, as provided by a further configuration of the invention, the force to reduce the tube diameter is provided by the second clamping tool, the tube is drawn down between this clamping tool and the take-up reel. In that case, the clamping tool forms an exact fixed point. Regulating the second clamping tool's speed relative to the first clamping tool controls the slack of the tube between the first clamping tool and the second clamping tool.

The invention also concerns a device for manufacturing an optical cable. The device of the invention differs from the device in EP 0 299 123 B1 in that a first clamping tool grips the welded tube between the welding installation and the tube reduction device, and a second clamping tool grips the welded tube between the tube reduction device and the take-up reel.

With the device of the invention, the forces for drawing the metal band from the supply reel, the forces that take place during the shaping of the metal band, as well as other friction forces, are provided by the first clamping tool, and the deformation force required to reduce the tube diameter is provided by the second clamping tool. In that case, the take-up reel only needs to provide the force for the elastic strain of the metal tube, which is relatively small. This prevents oval deformation of the tube's cross section.

The invention will be fully understood when reference is made to the following detailed description taken in conjunction with the accompanying drawing.

DETAILED DESCRIPTION OF THE INVENTION

Figure 1:
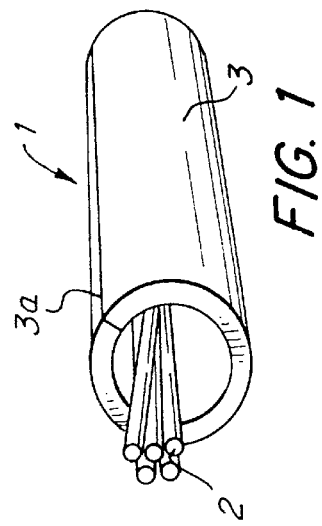
FIG. 1 is a perspective view of part of an optical fiber cable manufactured in accordance with the principle of the invention.

Turning first to FIG. 1, therein is illustrated a portion of an optical fiber cable 1 produced in accordance with the principle of the present invention. The optical fiber cable 1 comprises optical fibers 2 in a metal tube 3 which contains a lengthwise welded seam 3a. The open space between the optical fibers 2 and the metal tube 3 can be filled with a petroleum jelly to prevent water from migrating lengthwise. The number of optical fibers 2 is usually between six and twenty, but can be up to 40. The optical fibers 2 have a longer length (or overlength) than the metal tube 3, thus are helicoidal or sinusoidal inside the metal tube 3. This overlength is normally about 0.3%.

The wall thickness of the metal tube is 0.2 mm while its outside diameter is 3.5 mm. This is typical data for an optical fiber cable, which is used instead of a wire in a transmission cable. Alloyed special steel is the material of preference for metal tube 3.

Figure 2:
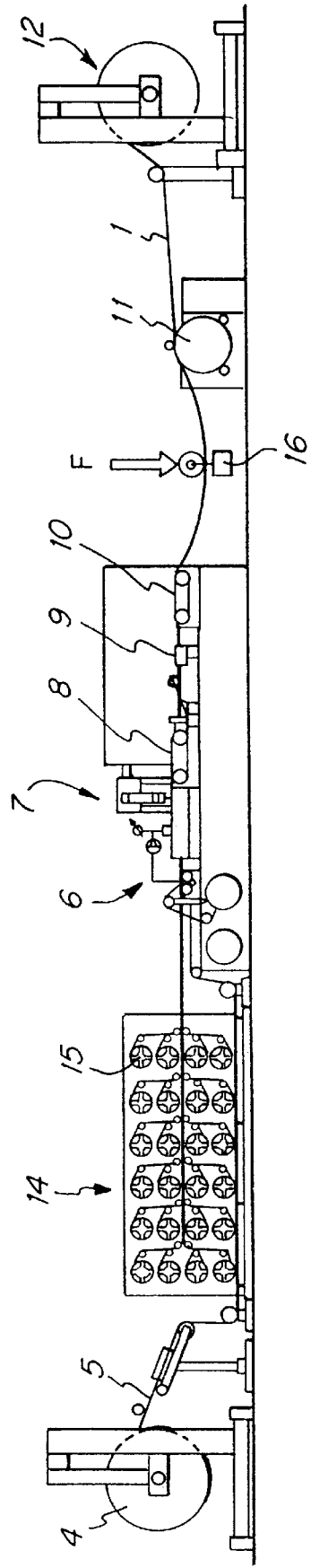
FIG. 2 is a side elevational view of a device for carrying out the method of the invention.

As seen in FIG. 2, a band 5 is continuously drawn from a supply reel 4 and fed to a forming device 6, in which the band 5 is shaped into a lengthwise slotted tube. Part of this forming device 6 is a trimming tool (not shown in detail), which is used to cut the band 5 to the required width. The forming tool 6 further comprises several sets of shaping rollers (not shown in detail). The lengthwise slot of the slotted tube is closed by a laser welding installation 7 which forms the lengthwise seam 3a (FIG. 1) Precise guidance of the slotted tube under the welding installation 7 is provided by a first clamping tool 8 containing a number of clamping jaw pairs that surround the tube a nd ar e driven by an endless chain. A tube reduction device 9, e.g. a drawing device in which the diameter of the tube is reduced, is located downstream of the first clamping tool 8. A second clamping tool 10 is located downstream of the tube reduction device 9 and grips the drawn tube and pulls it through the drawing device. The drawing speed of the second clamping tool 10 with respect to the drawing speed of the first clamping tool 8 is controlled as a function of the tube's slack between the drawing device 9 and the first clamping tool 8. A driven take-up reel 11 is located downstream of the second clamping tool 10, and the tube is wound several times around its periphery. The speed of take-up reel 11 equals the take-up speed of the second clamping tool 10. A storage reel 12 is located behind take-up reel 11 and reels the cable 1 under a slight tension.

A supply device 14 for a number of optical fibers 2 is located between the supply reel 4 and the forming device 6 and is equipped with a number of spools 15 onto which the optical fibers 2 are wound. The optical fibers 2 are drawn from the spools 15 and introduced into the slotted tube before the welding installation. A stationary metal tubelet (not shown) protrudes into the slotted tube as protection for the sensitive optical fibers 2, which are guided through it. At the earliest, the metal tubelet releases the optical fibers 2 behind the welding installation. The metal tubelet is concentrically surrounded by another metal tubelet (not shown). The tube is filled with petroleum jelly under pressure through the annular gap formed by the two concentric metal tubelets. To provide the optical fibers 2 inside metal tube 3 with overlength, the welded metal tube is continuously and elastically strained, i.e. expanded, between the second clamping tool 10, whose pairs of jaws securely grip the welded metal tube and apply the deformation forces to produce the tube reduction, and the take-up reel 11. This causes the take-up reel 11 to wind the same length of metal tube 3 and optical fibers 2. The elastic strain "relaxes" on take-up reel 11 thereby shortening the metal tube 3 to its normal condition and providing the overlength.

The elastic strain is caused by a force F, which deflects the welded metal tube between the second clamping tool 10 and the take-up reel 11. This is achieved with a weight 16, which is hung onto the metal tube, e.g. by means of a roller (not shown in detail). The force F, i.e. the weight 16, determines the magnitude of the deflection and thereby the magnitude of the expansion.

With a specified geometry and by choosing the material for metal tube 3, a selection of the weight 16 can produce an exact overlength of the optical fiber 2 inside tube 3.

The preferred embodiment described above admirably achieves the objects of the invention. However, it will be appreciated that departures can be made by those skilled in the art without departing from the spirit and scope of the invention which is limited only by the following claims.

What is claimed is:

1. Apparatus for manufacturing an optical fiber cable, having a metal tube with at least one optical fiber therein, the apparatus comprising:

(a) a device for continuously shaping a metal band into a lengthwise slotted tube;

(b) a welding installation downstream of the shaping device for producing a welded tube from the lengthwise slotted tube;

(c) a first clamping tool for gripping the welded tube downstream of the welding installation;

(d) a tube reducing device located downstream of the welding installation for producing a reduced outside diameter welded tube from the welded tube;

(e) a second clamping tool for gripping the reduced outside diameter welded tube downstream of the tube reducing device; and (f) a take-up reel downstream of the second clamping tool upon which the reduced diameter welded tube is wound.

* * * * *